United States Patent
Leitner et al.

(10) Patent No.: US 7,269,666 B1
(45) Date of Patent: Sep. 11, 2007

(54) MEMORY UTILIZATION IN A NETWORK INTERFACE

(75) Inventors: Brian M. Leitner, Hillsboro, OR (US); Dominic Gasbarro, Forest Grove, OR (US); Tom Burton, Beaverton, OR (US); Dick Reohr, Hillsboro, OR (US); Ni Jie, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 09/608,645

(22) Filed: Jun. 30, 2000

(51) Int. Cl.
*G06F 15/16* (2006.01)
*G06F 15/173* (2006.01)

(52) U.S. Cl. ...................... 709/250; 709/223
(58) Field of Classification Search ................ 709/250; 710/54, 55
See application file for complete search history.

(56) References Cited

U.S. PATENT DOCUMENTS

| | | | | |
|---|---|---|---|---|
| 5,347,632 A | * | 9/1994 | Filepp et al. | 709/202 |
| 6,067,407 A | * | 5/2000 | Wadsworth et al. | 709/250 |
| 6,134,481 A | * | 10/2000 | Warren | 700/28 |
| 6,199,100 B1 | * | 3/2001 | Filepp et al. | 709/203 |
| 6,275,852 B1 | * | 8/2001 | Filepp et al. | 709/220 |
| 6,327,625 B1 | * | 12/2001 | Wang et al. | 709/250 |
| 6,453,360 B1 | * | 9/2002 | Muller et al. | 709/250 |
| 6,591,302 B2 | * | 7/2003 | Boucher et al. | 709/250 |
| 6,611,879 B1 | * | 8/2003 | Dobecki | 710/1 |

\* cited by examiner

*Primary Examiner*—Glenton B. Burgess
*Assistant Examiner*—Aaron Strange
(74) *Attorney, Agent, or Firm*—Schwegman, Lundberg, Woessner & Kluth P.A.

(57) ABSTRACT

Packet sequence numbers of request packets and response packets of transactions transferring data to or from a network interface are tracked. For every request packet transmitted by the network interface, the packet sequence number of the packet is written to a location in a circular send queue pointed to by a write pointer and a valid bit at the location is set. The write pointer is incremented if the packet is a read request packet. Alternatively, a read indicator at the location in the circular send queue pointed to by the write pointer is cleared if the packet is not a read request packet. For every response packet received by the network interface, the packet sequence number of the response packet is checked against the packet sequence number stored at the location in the circular send queue pointed to by the read pointer of the circular send queue.

14 Claims, 8 Drawing Sheets

MEMORY UTILIZATION IN A NETWORK INTERFACE

BACKGROUND

1. Field of the Invention

This invention relates generally to network interfaces transferring data between a host processing device and a network connection. In particular, the present invention relates to memory utilization in a network interface controller transferring data between a network connection and a host interface or bus.

2. Description of the Related Art

A network interface controller (NIC) generally acts as the communications intermediary between a network and a host processing system. In a host processing system such as a server, there may be a large amount of data storage and communications functionality and the performance of the host processing system may be adversely affected by the demands of the NIC to access processors and other resources during data transfer operations.

The Virtual Interface (VI) Architecture, Version 1.0, published Dec. 16, 1997 was developed to enable NICs to carry out efficient, low overhead, data transfers without making large demands on the processor(s) of the host processing system. It decouples the processor(s) from the I/O subsystem and transfers data directly to and from host memory using a plurality of send queues which transmit request packets and receive response packets and a plurality of receive queues which receive request packets and transmit response packets. While a VI NIC addresses the problems of reliability, performance and complexity in the host processing system, the management of the send and receives queues increases the complexity within the VI NIC. Each send queue and each receive queue are able to both transmit and receive data. A context memory can be used for storing the state information of each send queue and each receive queue. Each data packet received or transmitted requires reading and modifying the context of the appropriate send queue or receive queue. Furthermore the data packets must be tracked in the NIC. For a send queue, a descriptor in the main memory indicates the type of packet (send, write, read) and the location where the data is to be written or read. This can be done by storing the sequence number and packet type for each of the packets. But, this has the disadvantage of requiring a larger and more complex context memory and method of accessing the data in the context memory.

Figure 1:
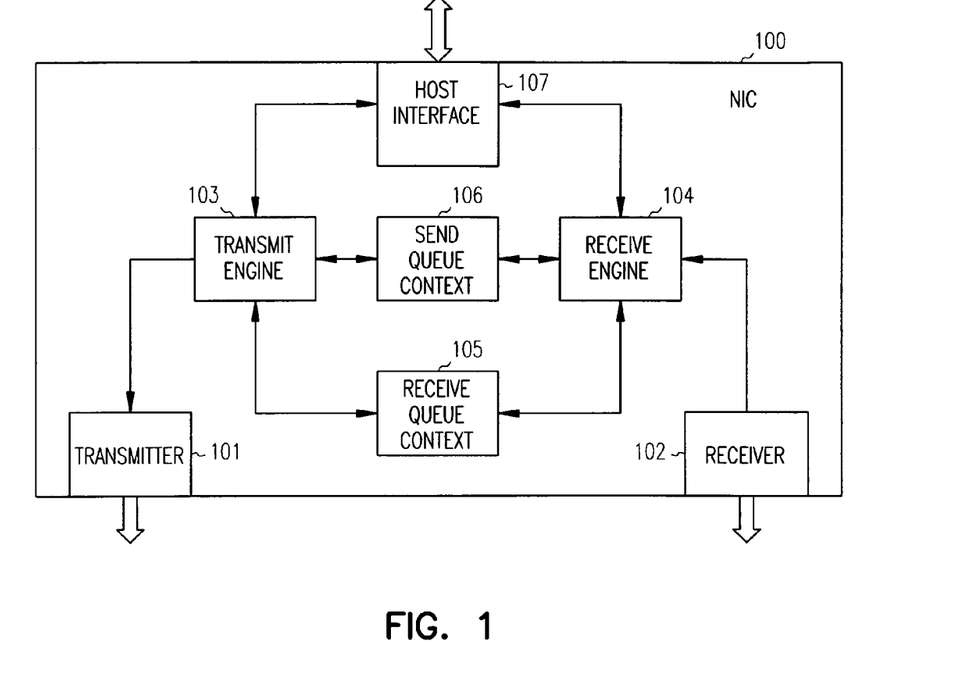
FIG. 1 is a block diagram of a NIC with separate transmit and receive engines.

FIG. 1 is a block diagram illustrating a typical arrangement of the context memory and the transmit and receive engines for tracking data packets in a NIC. Receiver 102 passes data received from the network to receive engine 104. Transmit engine 103 provides data to be transmitted over the network to transmitter 101. Transmitter 101 and receiver 102 connect only to transmit engine 103 and receive engine 104, respectively. Receive engine 104 receives: 1) request packets sent by the send queue of another NIC to receive queues in the NIC; and 2) response packets from the receive queue of another NIC responding to request packets sent from send queues in the NIC through receiver 102. It handles the packets according to context data in send queue context 106 and receive queue context 105 and provides the data from the packets to the host via host interface 107. Transmit engine 103 transmits: 1) request packets from send queues in the NIC to the receive queues in another NIC; and 2) response packets from a receive queue in the NIC responding to request packets sent by the send queues of another NIC through transmitter 101. Transmit engine 103 obtains data from the host via host interface 107 and provides it to transmitter 101 to be transmitted according to the descriptors and the context data in send queue context 106 and receive queue context 105. As shown, transmit engine 103 and receive engine 104 both access the send queue context 106 and receive queue context 105 to obtain the context of the send queues and receive queues.

An example of a NIC with separate receive channel and transmit channel DMA engines and a single memory shared by the engines appears at page 76 of the Aug. 24, 1998 issue of *Electronic Engineering Times*. The memory access controller apparently arbitrates accesses to the shared memory requested by the separate transmit and receive engines. This forces one engine to wait if both engines attempt accesses simultaneous or near-simultaneous accesses. Also, simultaneous or near-simultaneous accesses may attempt to modify the same send or receive queue context. Modification procedures in the memory access controller must take them into account so that they do not work on the same send or receive queue context at the same time. A dual-port memory could be used as in FIG. 1, but that would double the number of necessary connections to the memory and still not resolve the problem of simultaneous accesses or simultaneously accessing the same send queue or receive queue. Furthermore, creating a dual-port memory is undesirable in any event because it makes the memory larger, more complex, and slower.

BRIEF DESCRIPTION OF THE DRAWINGS

A better understanding and appreciation of the foregoing and of the attendant advantages of the present invention will become apparent from the following detailed description of example embodiments of the invention. While the foregoing and following written and illustrated disclosure focuses on disclosing example embodiments of the invention, it should be clearly understood that the same is by way of illustration and example only and is not to be taken by way of limitation.

DETAILED DESCRIPTION

While example embodiments are described herein, the present invention is applicable for use with all types of computer networks, network interfaces and chipsets, including follow-on chip designs which link together such disparate processing systems as computers, servers, peripherals, storage devices, and devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO), Infiniband or other channel based, switched fabric architecture. LAN networks may include versions of Ethernet, Gigabit Ethernet, FDDI (Fiber Distributed Date Interface), Token Ring, Asynchronous Transfer Mode (ATM), Fibre Channel and Wireless. For the sake of simplicity, discussions will concentrate mainly on an NGIO or Infiniband networks having several nodes (e.g., computers, servers and I/O units) interconnected by corresponding network interfaces, although the scope of the present invention is not limited thereto. A wide variety of implementations, arrangements and configurations of devices (e.g., host systems and I/O units), switches and links in all types of data networks may be possible.

According to an example embodiment or implementation, the various devices connected to the network may utilize network interfaces compatible with the NGIO specifications, Version 1.0, published by the NGIO forum on or about Jul. 20, 1999 or with the Infiniband specifications developed by the Infiniband Trade Association (www.infinibandta.org). The network consists of a channel-based switched fabric (e.g., collection of links, switches and/or switch elements connecting a number of host systems and I/O units over logical channels), and the endpoint may be a host system or a target system such as an I/O unit. In such a network, the network interfaces are referred to as host channel adapters (HCAs) or target channel adapters (TCAs). Both the HCA and the TCA may be broadly considered as fabric adapters provided to interface endpoints to the switched fabric, and may be implemented in compliance with the NGIO or Infiniband specification for enabling the devices at the endpoints to communicate with each other over a channel(s).

Figure 2:
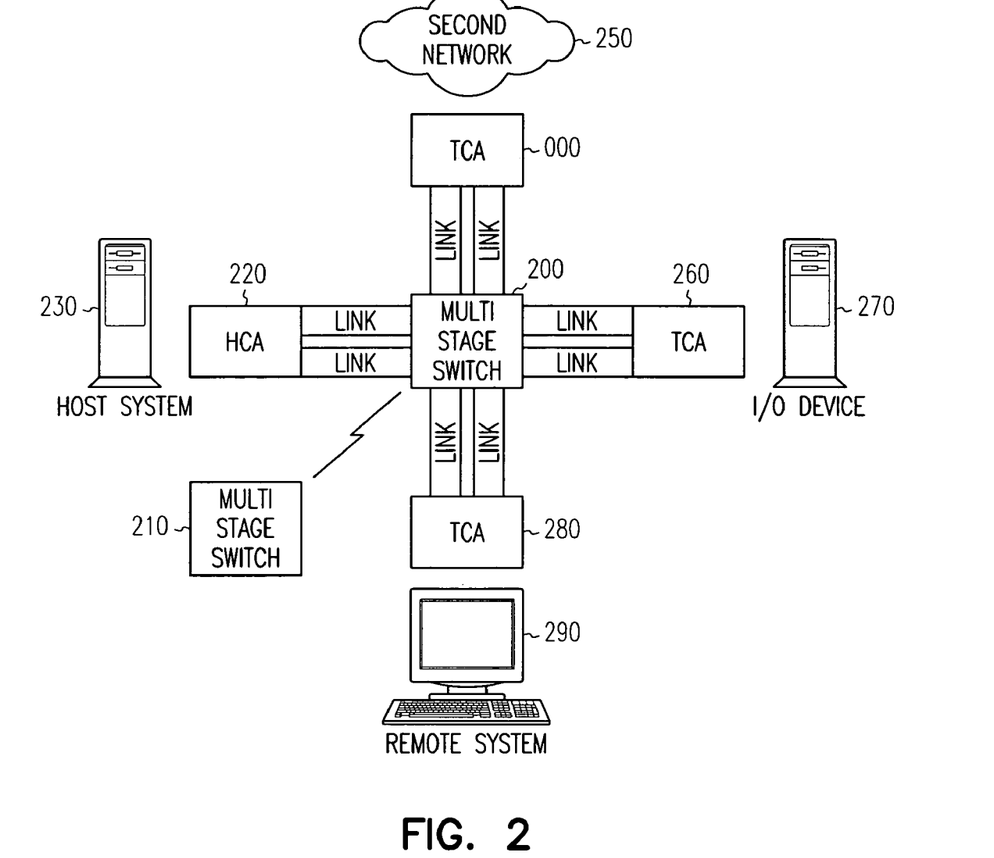
FIG. 2 is a schematic representation of a network of NGIO or Infiniband architecture in which the example embodiments of the present invention may be practiced.

FIG. 2 schematically represents a data network using NGIO or Infiniband architecture to transmit data over point-to-point links into a device responsible for processing that data according to an example embodiment of the present invention. As shown in FIG. 2, the computer network includes a multi-stage switch 200 comprised of a plurality of switches for allowing host systems and target systems to communicate to a large number of other host systems and target systems. Although a single multi-stage switch is shown in FIG. 2, a number of end stations, switches and links, etc., are used to relay data in groups of cells between the end stations and switches via corresponding links and are generally collectively referred to as the network fabric. The nodes shown in FIG. 2 include: a host processing system 230; another network 250, including, but not limited to, a local area network (LAN), ATM, fibre channel network, and the Internet; an input/output (I/O) device 270; and a remote system 290 such as a computer or server. However, the nodes may include any other processing device or intermediate node.

The network fabric may include a central network manager 210 connected to multi-stage switch 200 and other fabric elements for managing network management functions. However, the central network manager 210 may alternatively be incorporated as part of either the host processing system 230, the second network 250, the I/O device 270, or the remote system 290. In either situation, it may be configured for learning network topology, determining the switch table or forwarding database, detecting and managing faults or link failures in the network and performing other network management functions.

A host channel adapter (HCA) 220 provides an interface between a memory controller (not shown) of the host processing system 230 and multi-stage switch 200 via high speed serial links. Similarly, target channel adapters (TCA) 240 and 260 provide an interface between multi-stage switch 200 and an I/O controller of either a second network 250 or an I/O device 270 via high speed serial links. Another target channel adapter (TCA) 280 may provide an interface between a memory controller (not shown) of the remote system 290 and the multi-stage switch 200 via high speed serial links. Of course, a processing system such as host processing system 230 or remote system 290 may have both a host channel adapter and a target channel adapter. The circuits and methods described below may be provided as part of a host channel adapter 220 to transition data from a host processing system or as part of a target channel adapter to transition data from a link into the respective target processing system.

Figure 3:
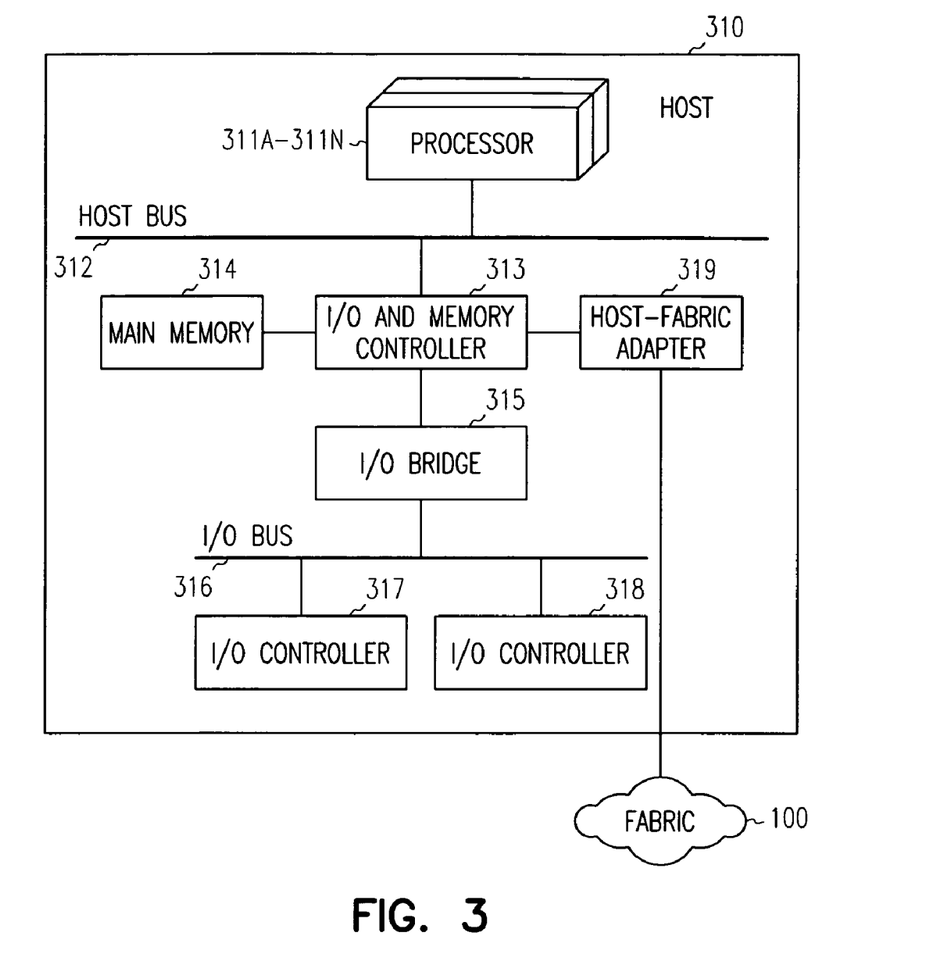
FIG. 3 is a generalized block diagram showing one possible implementation of a host channel adapter according to the invention to connect a host processing system to a network.

An example application of a fabric channel adapter in a host processing system connected to a data network is shown in FIG. 3. Host processing system 310 may be a multi-processor system, including one or more processors 311a-311n coupled to a host bus 312. Each of the multiple processors 311a-311n may operate on a single item (I/O operation), and all of the multiple processors 311a-311n may operate on multiple items (I/O operations) on a list at the same time. An I/O and memory controller interface 313 (or chipset) is connected to the host bus 312. A main memory 314 may be connected to the I/O and memory controller 313. An I/O bridge 315 operates to bridge or interface between the I/O and memory controller 313 and an I/O bus 316. Several I/O controllers may be attached to I/O bus 316, including I/O controllers 317 and 318. I/O controllers 317 and 318 (including any I/O devices connected thereto) may provide bus-based I/O resources.

Figure 4:
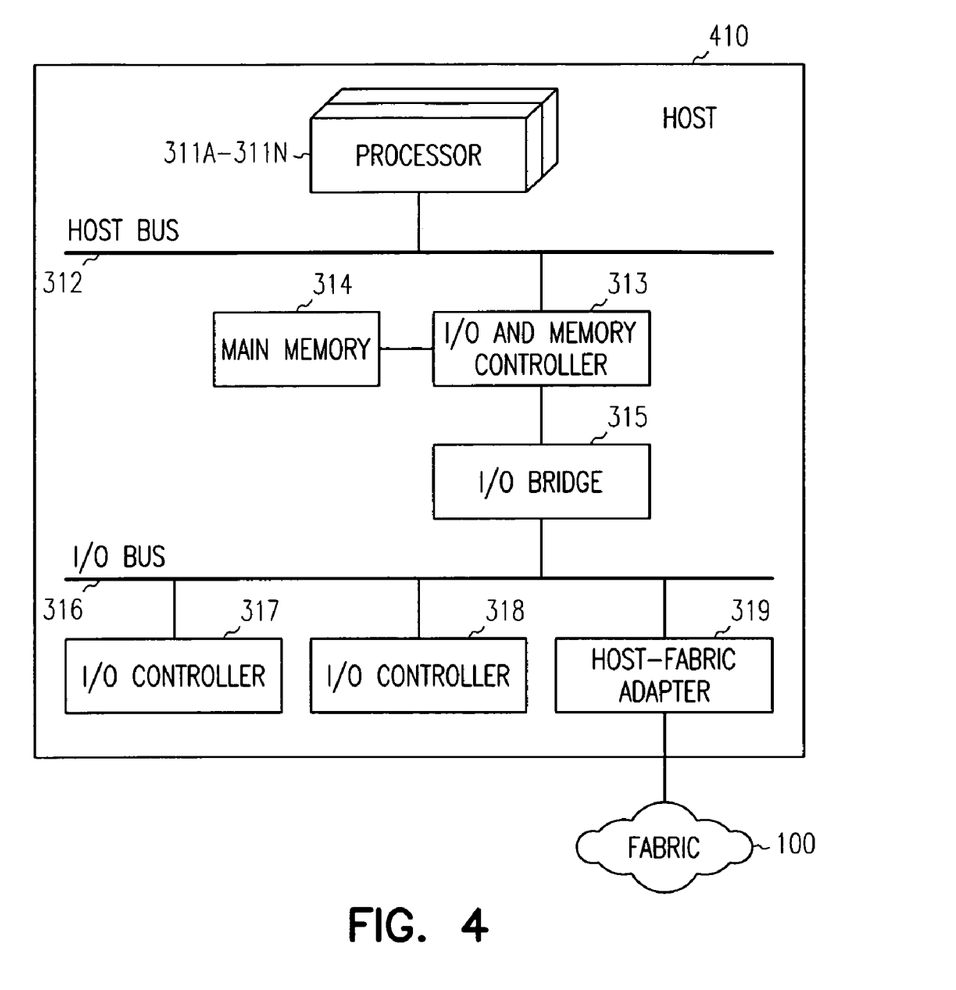
FIG. 4 is a generalized block diagram showing another possible implementation of a host channel adapter according to the invention to connect a processing system to a network.

As shown in FIG. 3, a channel adapter 319 is preferably connected between the I/O and memory controller 313 and the network switching fabric 100. In the event that the I/O and memory controller 313 in any given processing system cannot directly support channel adapter 319, then a channel adapter 319' can be connected to PCI bus via an expansion card as shown in FIG. 4. However, the connection of a channel adapter directly to the I/O and memory controller 313 as shown in FIG. 3 has the advantage of avoiding the afore-mentioned limitations of the I/O bus 316. In either instance, one or more fabric channel adapters may be provided to interface the host system 310 to the network switching fabric 100.

A software stack may be provided in channel adapter 319 or 319' to access the network switching fabric 100 and information about fabric configuration, fabric topology and connection information. The operating system (not shown)

of the processing system 310 may include a fabric interface layer and a fabric adapter device-specific driver utilized to establish communication with a remote fabric-attached agent (e.g., I/O controller) of another processing system connected to the network, and perform functions common to most drivers, including, for example, host-fabric adapter initialization and configuration, channel configuration, channel abstraction, resource management, fabric management service and operations, send/receive I/O transaction messages, remote direct memory access (rDMA) transactions (e.g., read and write operations), queue management, memory registration, descriptor management, message flow control, and transient error handling and recovery. Such a software driver module may be written using high-level programming languages such as C, C++ and Visual Basic, and may be provided on a tangible medium, such as a memory device, magnetic disk (fixed, floppy, and removable), other magnetic media such as magnetic tapes; optical media such as CD-ROM disks, or via Internet download, which may be available for a network administrator to conveniently plug-in or download into an existing operating system (OS). Such a software driver module may also be bundled with the existing operating system which may be activated by a particular device driver.

The example embodiments of the network interfaces according to the invention described in this application are implemented as channel adapters compliant with the NGIO or Infiniband specifications. It should be understood that the terminology of "packets" is used differently in the different specifications. In NGIO, packets are made up of one or more cells, while in Infiniband messages are made up of one or more packets. The example embodiment and other embodiments of the invention can be implemented in conjunction with other types of switch fabric-based I/O architectures. The example embodiment uses a similar model for input/output data transfer as is specified by the Virtual Interface (VI) architecture. A highly efficient interface may thus be beneficially used by various computer devices having a channel adapter connected to a network fabric. However, such an implementation is but one possible application of the example embodiment which may, of course, be applied in any device having a processor and indeed in any server architecture where an improvement in the speed of communications with a network is desired for whatever reason.

Figure 5:
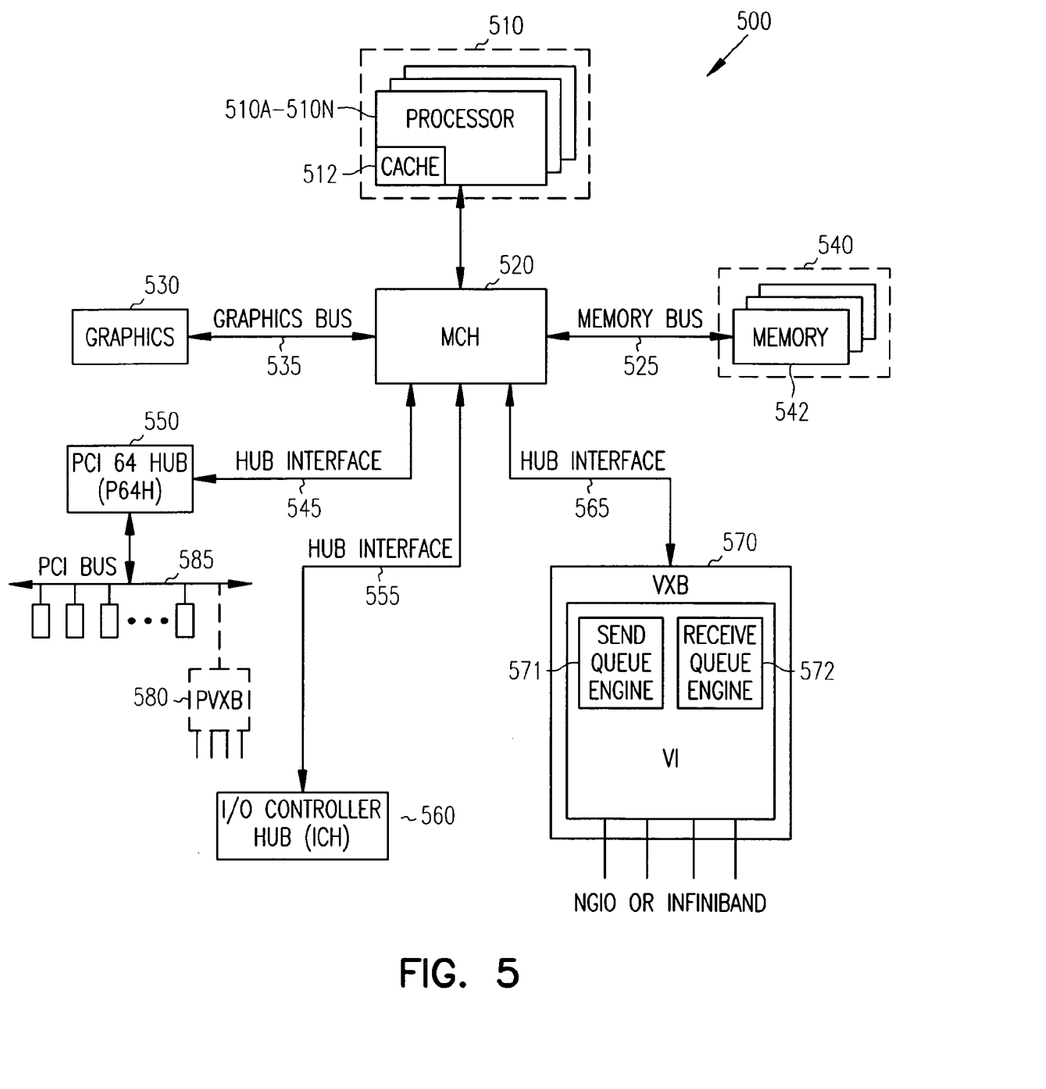
FIG. 5 shows a possible architecture of a host processing system having an example embodiment of the invention included in a virtual interface expansion bridge thereof.

Attention now is directed to FIG. 5, an example computer system platform having an example virtual interface expansion bridge incorporated therein according to the principles of the present invention. As shown in FIG. 5, the computer system 500 may comprise a processor subsystem 510 (which may be comprised of a plurality of processors and at least one cache memory 512), a memory controller hub (MCH) 520 connected to the processor subsystem 510 (such as by a host or a processor front side bus), a graphics subsystem 530 (possibly including a AGP 4×graphics controller, a local memory and a display device such as a cathode ray tube, liquid crystal display, or flat panel display) connected to the memory controller hub 520 by a graphics bus 535 (such as an AGP 2.0 bus) and a memory subsystem 540 storing information and instructions for use by the processor subsystem 510 and having at least one memory element 542 connected to MCH 520 by a memory bus 525. The memory element 542 is preferably a dynamic random-access-memory (DRAM), but may be substituted for read only memory (ROM), video random-access-memory (VRAM) and the like. The memory element 542 stores information and instructions for use by the host processors 510*a*-510*n*.

There may also be a plurality of controller hubs connected to MCH 520 for providing interfaces with various peripheral devices and buses. For example, a 64-bit hub bridge (P64H) 550 for a Peripheral Component Interconnect (PCI) bus may be connected to MCH 520 by a 16 bit hub interface 545, and may operate as an interface between MCH 520 and peripheral PCI bus 585. PCI bus 585 may be a high performance 32 or 64 bit synchronous bus with automatic configurability and multiplexed address, control and data lines as described in the latest version of "*PCI Local Bus Specification, Revision 2.2*" set forth by the PCI Special Interest Group (SIG) on Dec. 18, 1998 for add-on arrangements (e.g., expansion cards) with new video, networking, or disk memory storage capabilities.

An I/O Controller Hub 560 may be connected to MCH 520 by a 16 bit hub interface 555, and may operate as an interface between MCH 520 and a plurality of input/output devices and/or buses (not shown). These buses may include, for example, a PCI bus, a Industry Standard Architecture (ISA) or an Expanded Industry Standard Architecture (EISA) bus. The I/O devices may include, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices.

A Virtual Interface Expansion Bridge (VXB) 570 maybe connected to MCH 520 by a 16-bit hub interface 565, and operates as an interface between MCH 520 and network fabric 100. There may also be, alternatively or in addition to VXB 570, a PCI Virtual Interface Expansion Bridge (PVXB) 580 connected to a PCI bus, such as PCI bus 585, and which operates as an interface between the PCI bus and network fabric 100. PVXB 580 may, but need not be, substantially similar to VXB 570. In an example embodiment, PVXB 580 and VXB 570 each utilize a silicon chip of a design having at least two different output stages, alternatively supporting either a PCI connection or a hub interface, so that any individual silicon chip can be utilized as either a PVXB or VXB by selectively connecting one of the output stages to the external leads of the silicon chip during the later steps of producing the silicon chip. Although only VXB 570 is mentioned hereafter in this detailed description, it should be understood that the description thereof is equally applicable to PVXB 580.

As a non-limiting example, MCH 520, PCI 64 Hub 550 and I/O Controller Hub 560 of computer system 500 may comprise an Intel®840 chipset or similar Intel® chipset. Of course, computer system 500 may utilize different I/O or memory controllers, may be conFigured differently, or employ some additional or different components than those shown in FIG. 5. In particular, a VXB may be easily added to any computer system having a PCI bus by installation of a PVXB add-on card.

VXB 570 includes a send queue engine 571 and a receive queue engine 572 supporting the VI architecture as well as other circuitry to transition data from the host channel adapter to MCH 520. Specifically, VXB 570 receives data from the network serial links and converts it into data suitable for transfer by the host interface to the host bus. In general, the data is destined to main memory. While providing high reliability and performance, the VI architecture does not perform transport level functions, such as flow control, buffer management, segmentation and reassembly, and link synchronization. Signaling protocols for the links in the example embodiments thus contain code groups to signal the beginning and end of a cell and the gap between cells, and code groups controlling the flow of cells across the link. For the NGIO example embodiment, Start of Cell Delimiter (SCD) and End of Cell Delimiter (ECD) characters, inter-cell flow control sequences (comma character and associated flow control character) and IDLE characters may be utilized.

Figure 6:
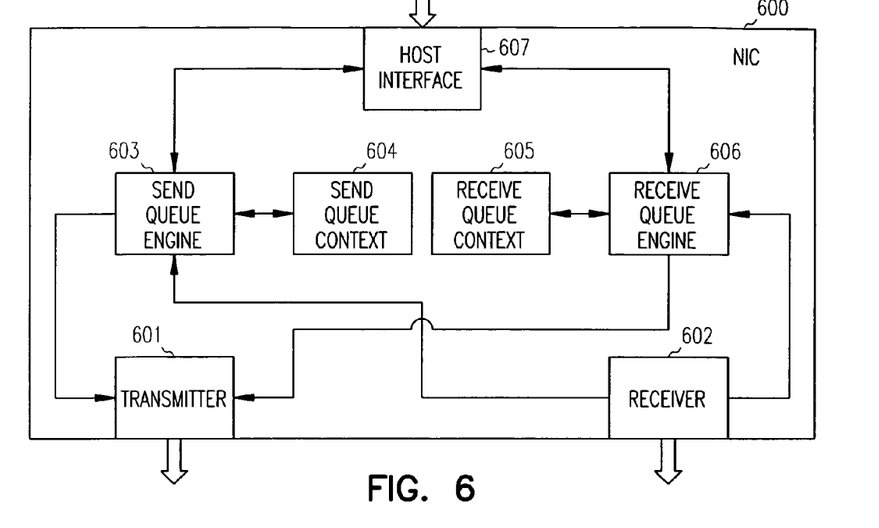
FIG. 6 is a block diagram of the basic logical elements of an example embodiment of a VI NIC with a send queue engine and a receive queue engine according to the present invention.

Turning now to FIG. 6, a generalized block diagram is provided of an example embodiment of a VI NIC 600 which may be implemented in VXB 570 or in any other host channel adapter, target channel adapter or network interface. Unlike VI NIC 100 in FIG. 1, VI NIC 600 does not use transmit and receive channel engines and a shared context memory for VI style protocols. VI NIC 600 has optimized queue-based partitioning of the protocol engine so that the context memory can be utilized in a more efficient manner. Transmitter 601 and receiver 602 of VI NIC 600 connect to the network channel(s) in the same manner as transmitter 101 and receiver 102 of VI NIC 100. However, transmitter 601 and receiver 602 do not connect exclusively to corresponding respective transmit and receive engines as in VI NIC 100.

VI NIC 600 is partitioned into a send queue engine 603 and a receive queue engine 606 instead of a transmit engine and a receive engine. As explained above, a transmit engine needs to transmit packets corresponding to both send queues and receive queues and, therefore, needs to connect to both the send queue context memory and the receive queue context memory. A receive engine has similar disadvantages. Send queue engine 603 sends request packets and receives response packets for send queues. Therefore, it only has to be connected to send queue context memory 604. Similarly, receive queue engine 605 receives request packets and sends response packets for receive queues and only has to be connected to receive queue context.

Send queue engine 603 and receive queue engine 606 operate independently and no data passes back and forth between the two (except perhaps indirectly by the host through host interface 607). This optimized partitioning allows send queue engine 603 and receive queue engine 606 to be directly connected with, and access only, send queue context memory 604 and receive queue context memory 605, respectively. This has the advantage of allowing each engine to immediately access its respective context memory without having to arbitrate for the memory. Conversely, send queue engine 603 and receive queue engine 606 are each connected to both of transmitter 601 and receiver 602 so that it can transmit and receive packets as required. However, unlike shared memory, there is not a large problem of simultaneous access since transmitter 601 and receiver 602 are connected to serial communication channels links and only one packet of data can be transmitted or receive at a time. Therefore, the queue-based partitioning of VI NIC 600 results, overall, in a reduction of complexity, development time, chip cost and in an increase in performance compared to separate transmit and receive partitioning.

Figure 7:
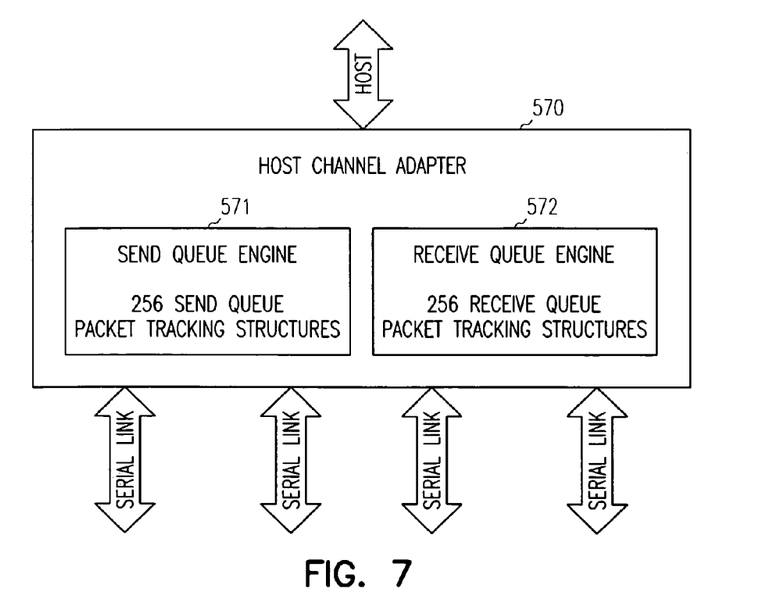
FIG. 7 is a block diagram of a Host Channel Adapter (HCA) according to another embodiment of the invention.

The block diagram in FIG. 6 is merely exemplary to illustrate the feature of queue-based partitioning in a VI NIC. As a specific example of the implementation of an embodiment of the invention, VXB 570 or PVXB 580 in FIG. 5 preferably has a plurality of serial communication channel links. There are four serial links in the example shown in FIG. 7. Also, as an example there may be 256 send queues and 256 receives queues connected to the serial links. The number of serial links, send queues and receive queues can obviously change based on design choice. As explained previously, VXB 570 is preferably composed of a single integrated circuit chip.

In the NGIO and Infiniband protocols utilized in the examples of the invention, a transaction over a channel providing an acknowledged class of service consists of a request packet sent by an initiating NIC to a destination NIC, and a response packet sent by the destination NIC to the initiating NIC acknowledging the request packet. In the instance of a send or write request packet, the response acknowledges that the data included with the send or write request packet was successfully transferred from the initiating NIC to the destination NIC. In the instance of a read packet, the request packet includes an address and a length identifying the data to be transferred from the destination NIC to the initiating NIC. The response packet for the read request packet includes the data identified by the request packet.

In either instance, the request packet and the response packet of a transaction are both numbered with the same packet sequence number identifying the transaction so that the destination NIC can reliably provide a response packet acknowledging the request packets sent by the initiating NIC. All request packets must be acknowledged in sequence number order (1, 2, 3, 4, etc.-not 1 3, 2, 4). However, a destination NIC can avoid the necessity of returning an individual response packet for each and every send or write request packet. A response packet can implicitly acknowledge a send or write request packet by returning a response packet including the packet sequence number for a later send or write request packet (a response packet must be returned for each read request packet since the response packet includes the data identified in the read request packet). In the instance where a destination NIC returns successive response packets for send or write request packets in which the packet sequence number skips, then the send or write request packet(s) corresponding to the skipped packet sequence numbers are implicitly acknowledged. For example, if a destination NIC returns sequence numbers 1, 2 and 5, then request packets 3 and 4 are implicitly acknowledged.

Regardless of the number of send queues and receive queues in an example embodiment of a NIC according to the invention, there must be a packet tracking structure for each send and receive queue in order to carry out the protocols described above. In the example HCA of FIG. 7, the send queue engine is shown as having 256 send queue packet tracking structures to match the 256 send queues in the HCA and the receive queue engine is shown as having 256 receive queue packet tracking structures to match the 256 receive queues in the HCA. The structures for packet tracking are nearly the same for both the send queues and the receive queues, but the information structures are updated during different events as explained in the below descriptions of two example methods of tracking the request and response packets of a data transaction.

Figure 8:
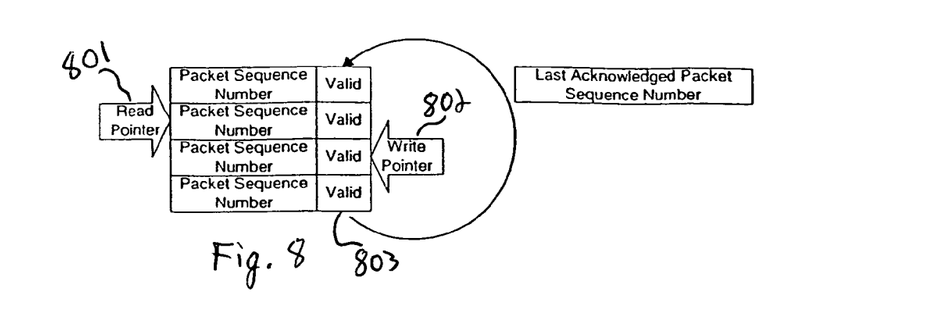
FIG. 8 illustrates the send queue packet sequence number tracking circular queue according to a circular queue tracking embodiment of the invention.
Figure 9:
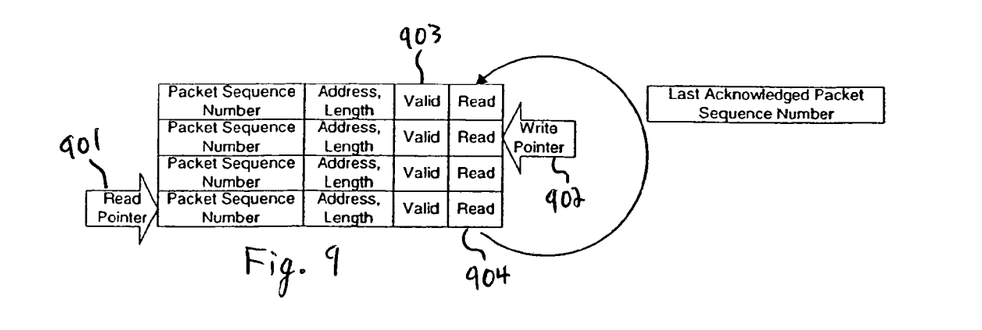
FIG. 9 illustrates the receive queue packet sequence number tracking circular queue according to a circular queue tracking embodiment of the invention.

The first example method of tracking is illustrated by the example circular queues shown in FIGS. 8 and 9. The necessary transaction tracking information is stored in the first example method using a circular queue having one more entry than the maximum number of read requests that can be outstanding at one time according to the protocol supported by a NIC pair. FIG. 8 shows a send queue packet sequence number tracking circular queue and FIG. 9 shows a receive queue packet sequence number tracking circular queue. As shown, they are four entry circular queues, which may be used for a NIC pair supporting a protocol allowing a maximum of three outstanding read requests. The circular queues allow three read requests to be tracked along with an additional fourth packet sequence number after the three read requests. The read pointer reads packet sequence numbers from the table. The write pointer adds packet sequence numbers to the table.

The send queue packet sequence number tracking circular queue in FIG. 8 tracks each read request packet sequence number and the last transmitted packet sequence number so it can validate response packets. For every transmitted packet, the packet sequence number is written to the location pointed to by write pointer 802 and the valid bit 803 is set. If the packet is a read request packet, the read indicator is set and write pointer 802 is incremented so the information will not be overwritten. For all other packet types, write pointer 802 is not incremented and the read indicator is cleared. This will allow the next write to the circular queue to overwrite the current packet sequence number, indicating that the previous packet may be implicitly acknowledged.

When a response packet is received, the packet sequence number is checked against the packet sequence number stored in the location in the circular queue pointed to by read pointer 801. If valid bit 803 for this entry is not set, no responses are expected and the packet is dropped. If valid bit 803 for this entry is set, the response packet sequence number must be equal to or earlier than the entry in the circular queue and after the last acknowledged packet sequence number. If the response packet is a read response, the packet sequence number must match the entry in the circular queue and the entry must be marked read. If the response packet sequence number matches the entry, the entry pointed to by read pointer 801 has valid bit 803 cleared and read pointer 801 is incremented if the response packet is a read response.

The read queue packet sequence number tracking circular queue in FIG. 9 tracks each read request packet sequence number and the last received packet sequence number so it can transmit response packets. For every received packet, the packet sequence number is written to the location pointed to by write pointer 902 and valid bit 903 is set. If the packet is a read request packet, read bit 904 is set and write pointer 902 is incremented so the information will not be overwritten. For all other packet types, write pointer 902 is not incremented and the read indicator is cleared. The next write to the circular queue will overwrite the current packet sequence number and thus cause the previous packet(s) to be implicitly acknowledged. When a response packet is to be transmitted, the packet sequence number pointed to by read pointer 901 is read. If the valid bit at the location is not set, nothing is transmitted. If read bit 904 is set, a read response packet is transmitted. Otherwise, an acknowledge response is transmitted. Once the packet has completed, valid bit 903 is cleared and then, if it's a read response, read pointer 901 is incremented.

Figure 10:
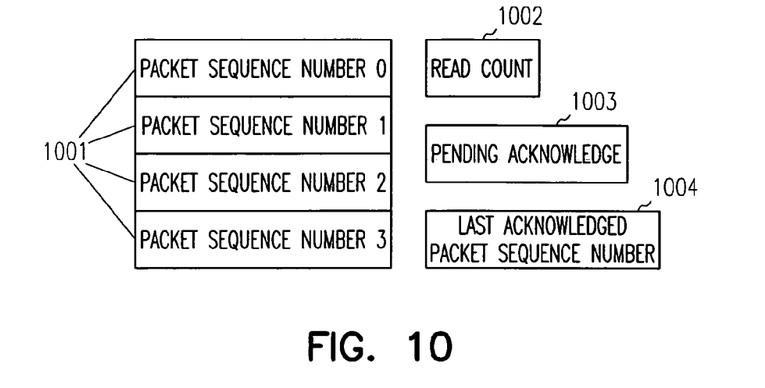
FIG. 10 illustrates the send queue packet sequence number table tracking according to a table tracking embodiment of the invention.
Figure 11:
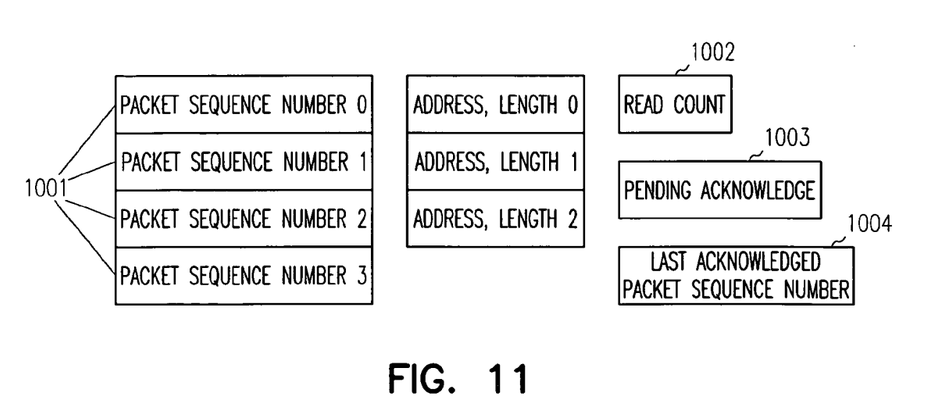
FIG. 11 illustrates the receive queue packet sequence number table tracking according to a table tracking embodiment of the invention.

A second example packet sequence number tracking method is illustrated in FIGS. 10 and 11. Unlike the first example method, the second example method uses a table rather than a circular queue having read and write pointers. Instead of read and write pointers, a read count 1002 is kept. The slots 1001 of the table are labeled starting at zero. The information is always read out of slot zero. When a packet sequence number is written, it is always written to the slot indicated by read count 1002. Pending Acknowledge bit 1003 marks whether or not an acknowledge (non-read) packet 110 sequence number is in the table. At the same time that the read point pointer would be adjusted in the first circular queue example method, all the entries in the table are shifted down one slot. Preferably, the implementation of the method supports shifting multiple entries at one time to save time.

An advantage of this second example method is that the read address and length entries only need to be three entries long. This is because the entries are always ordered from first to last in the table method, but the circular queue changes the order of the entries based on the position of the read pointer. Of course, as the NIC pair supports more outstanding reads, the first circular queue example method becomes increasingly preferable since it has the advantage of saving time by not having to copy data.

A way to avoid these techniques would be to store the sequence number and packet type for all transmitted or received packets. This would require much more memory and be more complex. In a NGIO example, this may require keeping track of 127 packets per work queue, which may be a large number of packet sequence numbers as compared to other methods. In this example, the send queue table tracker consumes only 43 bits of memory per send queue. In order to track all possible 127 outstanding packets, a send queue would need a minimum of 127 bits to know whether each packet is a read or not. In order to distinguish between sends, writes, reads, and invalid packet sequence numbers, two bits would be required for each of the 127 outstanding packets, requiring at least 256 bits. The two methods described here reduce memory by a factor of three and six over tracking all possible packets. With 256 send queues, this becomes a memory reduction of 21,504 bits.

The invention is not limited to the example embodiments described above. Indeed, an advantage of the invention is that it may be particularly useful and widely adaptable to many network devices. In this way, data transfers can be made efficient by network interface controllers as discussed in the example embodiment.

The invention is not limited to a host processing system having an architecture as illustrated in FIG. 3. Indeed, an advantage of the invention is that it may be useful and widely adaptable to many data bridges. For example, although it is preferred that a VXB connect directly to a memory controller hub as shown in FIG. 3, it may also be implemented as a PCI Virtual Interface Expansion Bridge (PVXB) connected to a PCI bus as exemplified by PVXB 380 in FIG. 3 or to a PCI-X bus (not shown) where interface 375 is replaced with an interface appropriate for the PCI or PCI-X bus. For example, the granularity of the incoming data can be converted as described above so that it has the granularity appropriate for transfer over a PCI or PCI-X bus. In particular, a VXB is provided as a single silicon integrated circuit chip in which a number of respective interfaces are contained so that manufactured quantities of the same silicon die can be implemented for use with any interface by changing the die and pin connections on the chip.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

The invention claimed is:

1. A method comprising:
tracking packet sequence numbers of request packets and response packets of transactions transferring data to or from a network interface, said method including,
for every request packet transmitted by the network interface,
writing the packet sequence number to a location in a circular send queue pointed to by a write pointer and setting a valid bit at said location, wherein the valid bit is indicative of whether at least one response is expected;
incrementing the write pointer if the packet is a read request packet or clearing a read indicator at the location in the circular send queue pointed to by the write pointer if the packet is not a read request packet; and
for every response packet received by the network interface,
checking the packet sequence number of the response packet against the packet sequence number stored at a location in the circular send queue pointed to by the read pointer of the circular send queue;
wherein a response packet is accepted if the valid bit at the location in the circular send queue pointed to by the read pointer is set and the packet sequence number of the response packet is both equal to or less than the packet sequence number written at the location in the circular send queue pointed to by the read pointer and greater than the last acknowledged packet sequence number, and
wherein, if the response packet is a read response packet, it is accepted if the packet sequence number of the read response packet is equal to the packet sequence number written at the location in the circular send queue pointed to by the read pointer and the read indicator is set.

2. The method recited in claim 1, wherein a response packet is dropped if the valid bit at the location in the circular send queue pointed to by the read pointer is not set.

3. The method recited in claim 1, wherein, if a response packet is accepted, the valid bit at the location in the circular queue pointed to by the read pointer is cleared and, if the response packet is a read response packet, the read pointer is incremented.

4. The method recited in claim 1, further comprising:
for every request packet received in the network interface,
writing the packet sequence number to a location in a circular receive queue pointed to by a write pointer and setting a valid bit at the location in the circular receive queue pointed to by the write pointer;
if the request packet is a read request packet, then setting the read bit at the location in the circular receive queue pointed to by the write pointer and incrementing the write pointer;
if the request packet is not a read request packet, then clearing the read bit at the location in the circular receive queue pointed to by the write pointer; and
reading the packet sequence number and valid bit at a location pointed to by the read pointer of the circular receive queue.

5. The method recited in claim 4, wherein a response packet is transmitted if the valid bit at the location pointed to by the read pointer of the circular receive queue is set.

6. The method recited in claim 5, wherein a read response packet is transmitted if the read bit at the location pointed to by the read pointer of the circular receive queue is set.

7. The method recited in claim 5, wherein the valid bit at the location of the circular receive queue pointed to by the read pointer is cleared and, if the response packet is a read response packet, the read pointer is incremented after the response packet is transmitted.

8. A computer program stored in a memory on a network interface, said program, when executed, causing said network interface to carry out a method comprising:
tracking packet sequence numbers of request packets and response packets of transactions transferring data to or from said network interface, said method including,
for every request packet transmitted by the network interface,
writing the packet sequence number to a location in a circular send queue pointed to by a write pointer and setting a valid bit at said location, wherein the valid bit is indicative of whether at least one response is expected;
incrementing the write pointer if the packet is a read request packet or clearing a read indicator at the location in the circular send queue pointed to by the write pointer if the packet is not a read request packet; and
for every response packet received by the network interface,
checking the packet sequence number of the response packet against the packet sequence number stored at a location in the circular send queue pointed to by the read pointer of the circular send queue;
wherein a response packet is accepted if the valid bit at the location in the circular send queue pointed to by the read pointer is set and the packet sequence number of the response packet is both equal to or less than the packet sequence number written at the location in the circular send queue pointed to by the read pointer and greater than the last acknowledged packet sequence number, and
wherein, if the response packet is a read response packet, it is accepted if the packet sequence number of the read response packet is equal to the packet sequence number written at the location in the circular send queue pointed to by the read pointer and the read indicator is set.

9. The computer program recited in claim 8, wherein a response packet is dropped if the valid bit at the location in the circular send queue pointed to by the read pointer is not set.

10. The computer program recited in claim 8, wherein, if a response packet is accepted, the valid bit at the location in the circular queue pointed to by the read pointer is cleared and, if the response packet is a read response packet, the read pointer is incremented.

11. The computer program recited in claim 8, further comprising:
for every request packet received in the network interface,
writing the packet sequence number to a location in a circular receive queue pointed to by a write pointer and setting a valid bit at the location in the circular receive queue pointed to by the write pointer;
if the request packet is a read request packet, then setting the read bit at the location in the circular receive queue pointed to by the write pointer and incrementing the write pointer;

if the request packet is not a read request packet, then
  clearing the read bit at the location in the circular
  receive queue pointed to by the write pointer; and
reading the packet sequence number and valid bit at a
  location pointed to by the read pointer of the circular
  receive queue.

12. The computer program recited in claim 11, wherein a response packet is transmitted if the valid bit at the location pointed to by the read pointer of the circular receive queue is set.

13. The computer program recited in claim 12, wherein a read response packet is transmitted if the read bit at the location pointed to by the read pointer of the circular receive queue is set.

14. The computer program recited in claim 12, wherein the valid bit at the location of the circular receive queue pointed to by the read pointer is cleared and, if the response is a read response, the read pointer is incremented after the response packet is transmitted.

* * * * *